United States Patent [19]
Smith

[11] Patent Number: 5,899,810
[45] Date of Patent: May 4, 1999

[54] DISTRIBUTED GAME ARCHITECTURE TO OVERCOME SYSTEM LATENCY

[75] Inventor: Joshua E. Smith, Barre, Mass.

[73] Assignee: Kaon Interactive Corporation, Cambridge, Mass.

[21] Appl. No.: 08/787,300

[22] Filed: Jan. 24, 1997

[51] Int. Cl.$^6$ ....................................................... A63F 9/22
[52] U.S. Cl. ............................................................ 463/42
[58] Field of Search ................................... 463/42, 41, 40

[56] References Cited

U.S. PATENT DOCUMENTS

| | | | |
|---|---|---|---|
| 4,570,930 | 2/1986 | Matheson | 463/41 |
| 4,572,509 | 2/1986 | Sitrick | 463/42 X |
| 5,558,339 | 9/1996 | Perlman | 463/42 |

*Primary Examiner*—Michael O'Neill
*Attorney, Agent, or Firm*—Henry D. Pahl, Jr.

[57] ABSTRACT

The distributed game system disclosed herein provides for interacting play between multiple users, even though the users are interconnected with a host computer through a data communication network having appreciable latency. The host computer supports a program for tracking and coordinating the definitive state of the game. The computers employed by each of the users support at least two types of program components, a display component and an interaction component. The interaction component is responsive to at least two kinds of user input, goal input which identifies user proxy movement within a virtual world and impact input which identifies direct interaction between the inputting user's proxy and the proxy of an identified other user. Goal input is interpreted by the host computer which distributes to all users information defining a plan of movement for the inputting user's proxy. In contrast, impact input causes the inputting user's computer to itself generate an effect plan which defines the effect the impact input will have on the other user's proxy. The effect plan is directly acted upon by the inputting user's display program and is distributed by the host computer to other users.

9 Claims, 5 Drawing Sheets

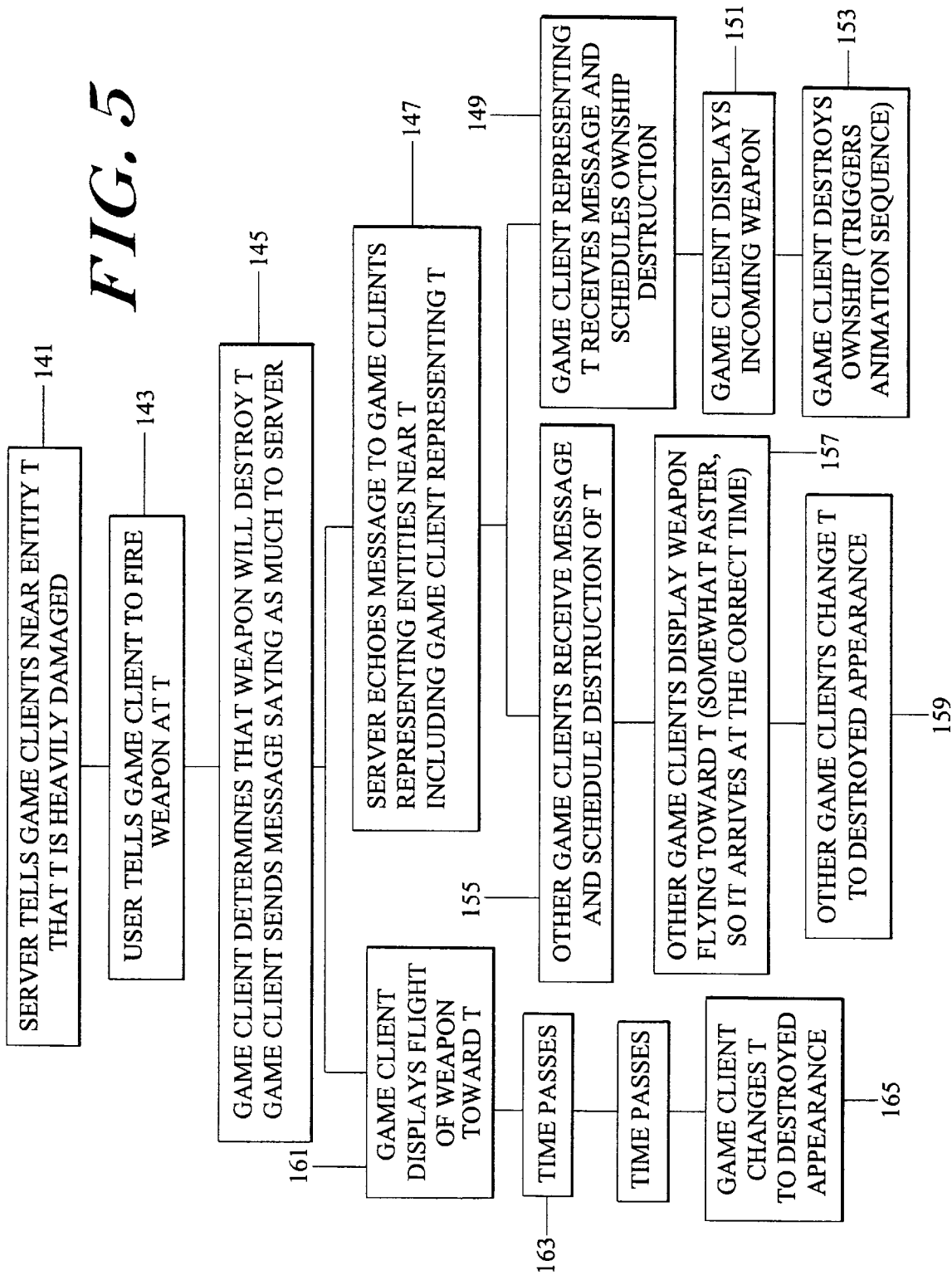

DISTRIBUTED GAME ARCHITECTURE TO OVERCOME SYSTEM LATENCY

BACKGROUND OF THE INVENTION

The present invention relates to a multi-user interactive game and more particularly to such a game which may be played between distributed users interconnected with a host computer through a data communication network having appreciable latency, such as the Internet.

There is appreciable interest in multi-user interactive gaming both for training purposes and for entertainment. For example, the Defense Advanced Research Projects Agency (DARPA) has funded the development of a SIMNET/DIS architecture for use in military training. The SIMNET/DIS architecture is based essentially on peer-to-peer Ethernet networks supporting a multicast mode of communication.

In the case of the SIMNET/DIS architecture, the effect of an action by one player on another player was typically modeled by the player towards which the action was directed so that the present situation and condition of that player (or his proxy) could be taken into account. For example, if the game being modeled was a tank battle, the effect of the firing of one tank upon another would be determined by the computer playing the role of the attacked tank, i.e. the proxy for one of the players.

There have also been proposed multi-user games in which the multiple users are linked through a host computer. While that host computer might be an Internet server, it was typically necessary that all players of a given game have direct access to that server rather than being connected through the Internet itself, because of the Internet's appreciable and often variable latency. In this type of game, essentially all interactions are controlled or modeled by the host which takes in input information from the distributed users and informs all users of the results of that input.

A principal object of the present invention is to facilitate multi-user, interactive play to users who may be fairly widely distributed and interconnected only by means of a data communication network having significant and variable latency, such as the Internet. To this end, a novel hybrid architecture has been devised.

SUMMARY OF THE PRESENT INVENTION

The system of the present invention provides for interactive play between distributed users of a computer game set in a virtual world. The system involves a host computer and a plurality of client computers interconnected by a data communications network. The host computer supports a host program which tracks and coordinates the definitive state of the game. Each of the client computers supports both a display program component and an interaction program component. The display program component is responsive to messages received from the host computer and to local user input for displaying a virtual world and, within that virtual world, proxies representing the users of the various client computers.

The interaction program component responds to at least two discrete kinds of user input, goal input which identifies user proxy movement within the virtual world and impact input which identifies direct interaction between the inputting user's proxy and the proxy of an identified other user. Goal input causes a corresponding goal message to be sent to the host computer and the host computer then in turn transmits, to the inputting user's client computer and to the client computers whose proxies are in the vicinity of the inputting user's proxy, a message defining a plan of movement for the inputting user's proxy.

In contrast, impact input locally generates an effect plan defining the effect the impact input will have on the other user's proxy. The effect plan is sent both to the host computer and is directly acted upon by the inputting user's display program. The host computer program responds to an effect plan message by transmitting, to other client computers whose proxies are in the vicinity of the inputting user's proxy, a message defining the effect of the direct interaction. Thus, the inputting user's display and the displays of the other client computers show the same actions at respectively appropriate times.

BRIEF DESCRIPTION OF THE DRAWINGS

FIG. 5 is a flow chart illustrating actions initiated by a user inputting impact information;

Corresponding reference characters indicate corresponding parts throughout the several views of the drawings.

DESCRIPTION OF THE PREFERRED EMBODIMENT

By way of example, the interactive game system of the present invention is described herein in the context of an interactive tank battle. In other words, the virtual world in which play takes place is a battlefield and the proxies for the various users are simulated tanks. It should be understood, however, that the architecture and principles of operation of the game system are applicable to a wide variety of games and not just battle or warfare games. Likewise, while one type of user input is referred to as "impacts" input, it is not intended that this term should be understood to imply physical impact or even hostile action. Rather, the term "impact" input is used in a sense to identify any action by one player or user which can be expected to have an effect (not necessarily physical) on the proxy for another player or user.

Figure 1:
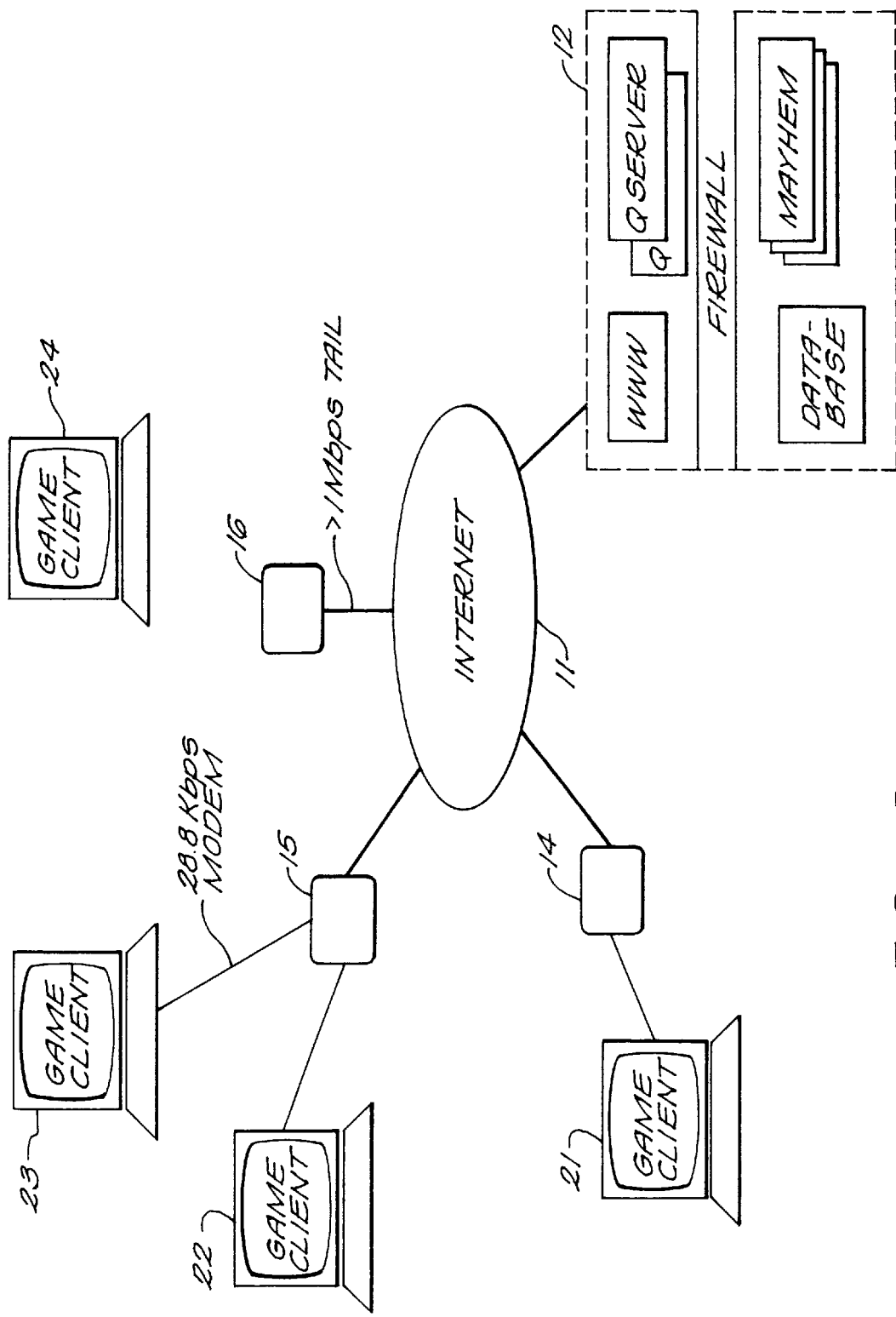
FIG. 1 is a diagram illustrating the overall arrangement of a game system in accordance with the present invention, including distributed users and a host computer interconnected by a data communications network.

As indicated earlier, one of the purposes of the present invention is to facilitate the playing of an interactive game over a data communication network such as the Internet having significant latency. Referring now to FIG. 1, the Internet generally is indicated by reference character 11. As is understood, access to the Internet for most users is provided through a so-called Internet service provider such as indicated at 13–15.

As indicated previously, the definitive state of a game is tracked and coordinated by a host computer system, designated generally in FIG. 1 by reference character 12 and described in greater detail hereinafter. Players or users of the game will use their personal computers (PCs) to access the Internet service providers 14–16 through the telephone network by means of modems, e.g operating at a data rate of 28.8 kbps. In FIG. 1, the PCs of the users or players are designated by reference characters 21–24 and are generally referred to herein as "client" computers.

Figure 2:
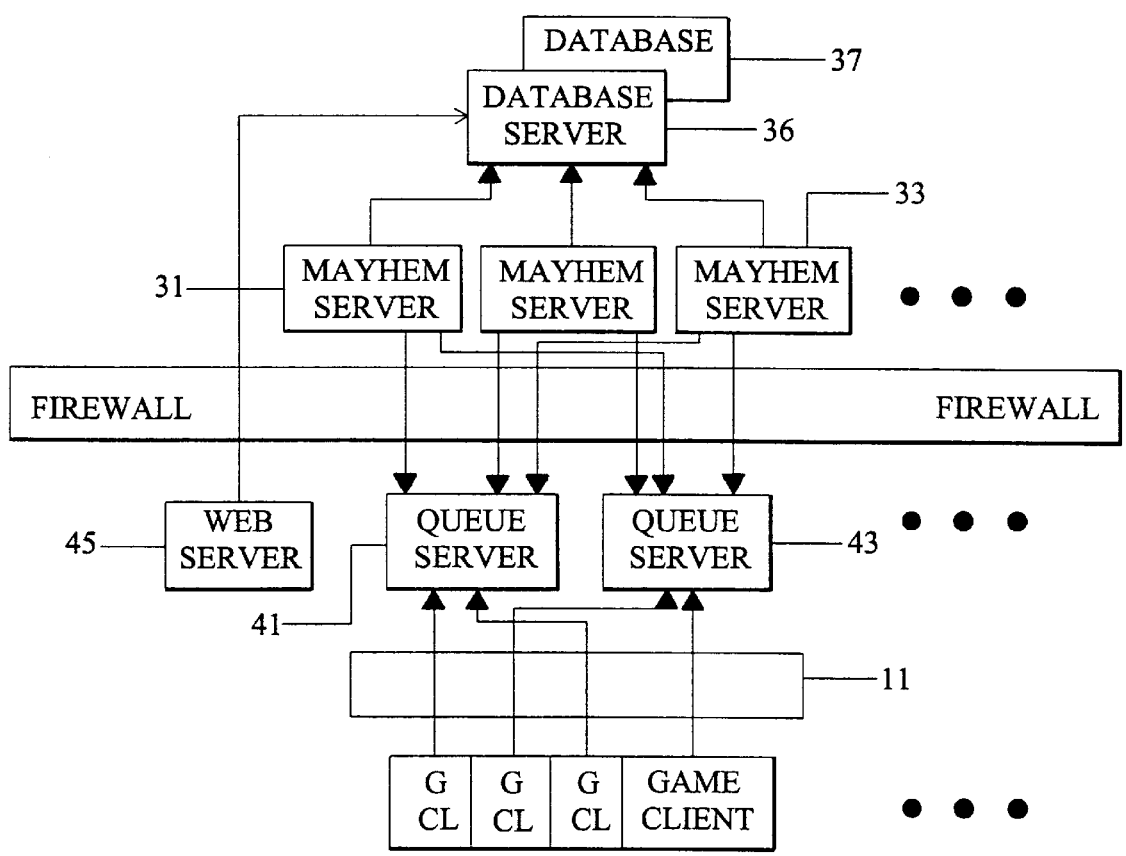
FIG. 2 is a block diagram illustrating a host computer configuration employed in the system of FIG. 1.

A presently preferred arrangement for the host computer system is illustrated in FIG. 2. Preferably, multiple server computers are provided as indicated by reference characters 31, 33, these being the processors which control the basic immediate and local game interaction on a real time basis. Overall and historical data is preferably stored on multiple database servers as indicated at reference characters 36 and 37 which are commonly accessible by the game servers 31–33. To relieve the game servers 31–33 from the burden of handling communications protocols, actual access to the Internet is preferably buffered through separate queue servers, as indicated at reference characters 41 and 43. Preferably also, a software facility commonly referred to as a firewall is interposed between the queue servers 41 and 43 and the game servers 31 and 33 to block any malicious access to the game servers themselves. The queue servers 41 and 43 thus provide the links to the Internet and thus to the game client computers.

Since the task of running the game may be considered separate from the business of providing the game, it is preferable that the system also include a web server 45 which conducts operations such as registering users, downloading the client computer software and similar activities not directly connected with the running of the game.

As indicated previously, the system of the present invention involves a distributed architecture employing both computer programs which run on a host and programs which run on client computers. The operator of the particular game will distribute program components to the client users which allow their computers to display a virtual world defined by messages received from the host computer and also to display, within the virtual world, proxies representing users of the various computers. In the preferred embodiment being described, the proxies are tanks but, as indicated previously, other types of games may also be facilitated by the architecture of the present invention. In order to minimize the amount of information which must be transmitted across the network, the client computers' software preferably includes a database defining various features and artifacts which may appear in the virtual world as well as a communications protocol which allows the host to define the location and behavior of the various artifacts as well as the various proxies. While the particular game being played by way of illustration is not a part of the present invention per se, a communications protocol for this game is set forth in Appendix I attached to this specification for general information.

As indicated previously, the system of the present invention employs a hybrid architecture in order to allow realistic interactive game play notwithstanding the use of a data communication network exhibiting significant latency, i.e. the time it may take a data packet to traverse the network.

Figure 3:
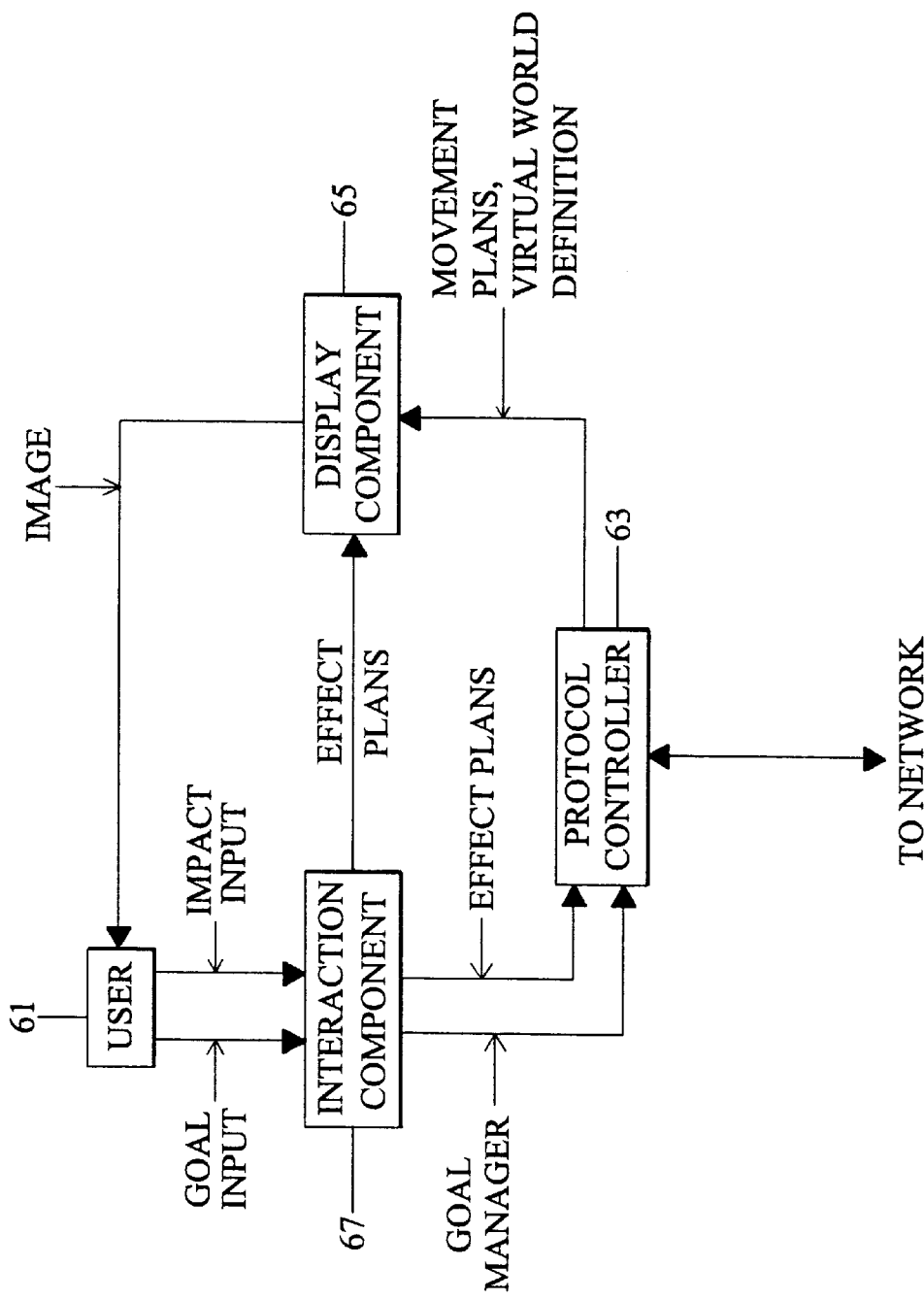
FIG. 3 is a diagram illustrating components of a computer program running on a user's computer in the system of FIG. 1.

FIG. 3 is a block diagram which represents in a general way some of the key program components which are included in the software which runs on a user's P.C., the user himself being designated by reference character 61. Messages to and from the host computer are coupled to the network through a program component which can be designated as a protocol controller 63.

As also indicated previously, it is the host computer 12 which tracks the definitive state of game. Messages from the host defining the virtual world and designating the various entities which may inhabit the virtual world are passed by the protocol controller 63 to a display component 65 which generates a corresponding image to display to the user. User input representing actions of his proxy are initially received by a portion of the program designated the interaction component 67.

Figure 4:
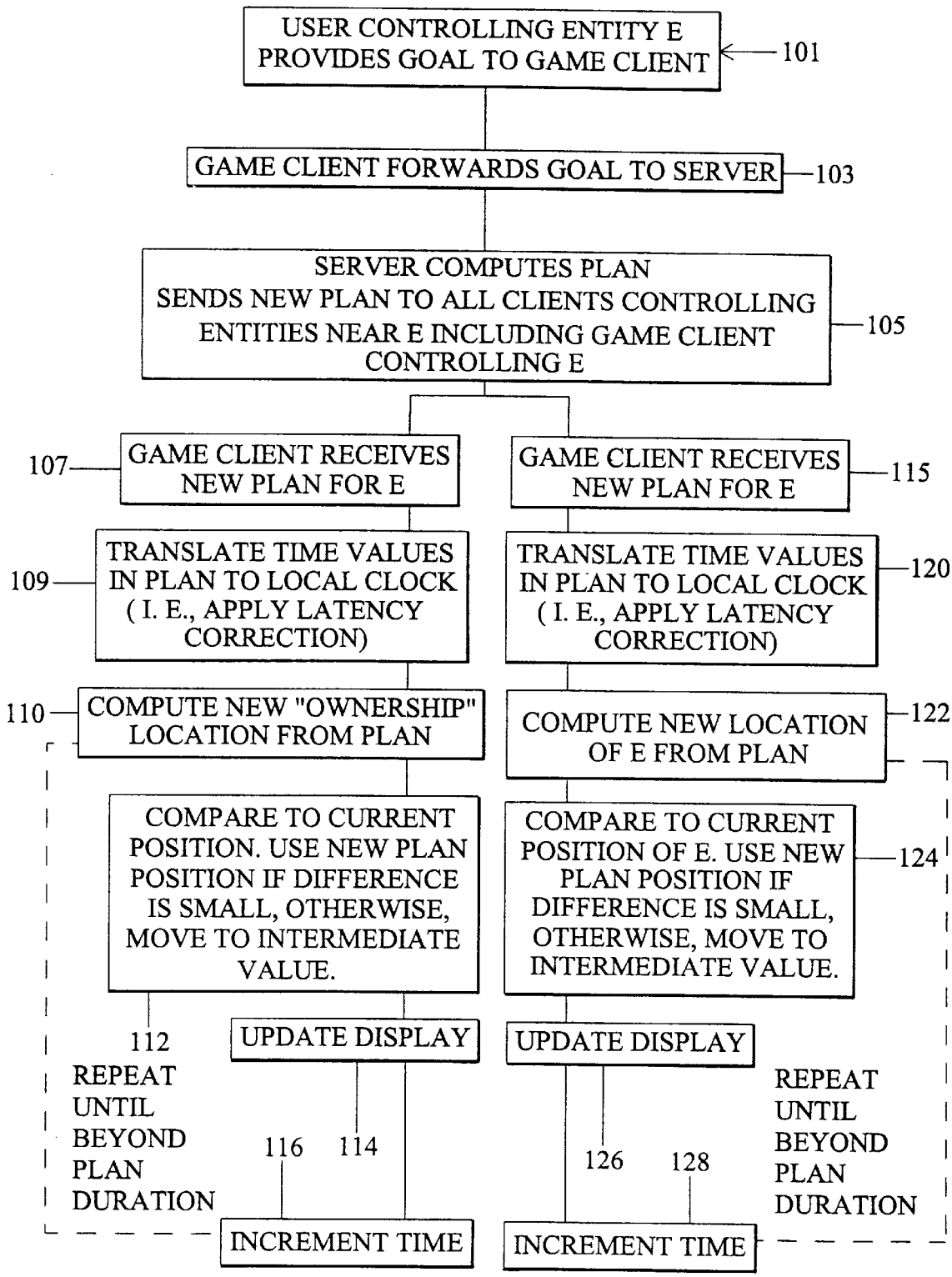
FIG. 4 is a flow chart illustrating actions occurring as a result of a user inputting goal information.

In order to permit the host computer to track and coordinate the definitive state of the game, user input which is intended to control movement of the user's proxy within the virtual world is relayed to the host computer for interpretation. This type of input is referred to herein as goal input. The host computer interprets the goal messages received and transmits messages which define a plan of movement for the proxy whose user inputted the goal information. This plan information is transmitted both to the inputting user's client computer and to those other client computers whose proxies are in the vicinity of the inputting user's proxy. The display program component 65 on each such client computer can then respond to the movement plan for controlling the display of the respective proxies within the virtual world. For these plans of movement, the system accepts the latency inherent in the data communications medium. This mode of operation is illustrated in greater detail in FIG. 4.

As indicated at step 101, the user controlling the entity or proxy designated E provides input identifying a goal to his computer. As indicated at block 103, the game client sends a message to the server reflecting the goal and, as indicated at step 105, the server computes a plan of movement and sends that plan to proxy E and all entities near it. Since the host computer tracks the definitive state of the game, including the location of all proxies within the virtual world, it can select proxies as being "in the vicinity of" the initiating proxy according to any preselected distance metric.

The initiating client receives the new plan as indicated at block 107, adjusts time values to correspond with the local client's clock as indicated at 109 and then computes a new location for its own proxy from that plan as indicated at 110. As will be understood by those skilled in the art, the proxy corresponding to the initiating user will have been following a previous plan during the latency time. Thus, it may be necessary to impose some smoothing in order to avoid jumps in the display and to provide an appearance of realistic motion. This smoothing is indicated at step 112. The game client then repeats this operation calling the plan incrementally and updating the display and incrementing its time value as indicated at steps 114 and 116, respectively.

While the initiating client is updating its own location, other game clients receive the same plan from the host as indicated at block 118. These other game clients likewise adjust to their local clock as indicated at block 120 and compute a new location for the initiating entity as indicated at 122. Again since each client proceeds on existing plans until it receives information about a new plan some smoothing may need to be applied as indicated at step 124. With the adjusted plan available, each other client can update its display to appropriately reflect how the initiating client should be seen from the point of view of that other client and again the plan is followed stepwise updating the display and incrementing time values for the duration provided by the plan. A particular system for defining plans and smoothing between plans is described in a paper Smith, J. E. (1994) "Near-term Movement Control in ModSAF," in Proceedings of the Fourth Conference on Computer Generated Forces and Behavioral Representation, Orlando Fla.

While plans can be generated which cover periods of time much longer than the network latency, there are typically in any game some events where cause and effect should follow so closely that no appreciable latency is acceptable to a realistic presentation. As indicated previously, user input triggering such events is referred to herein as impact input in that the inputting user's action is expected to directly affect the proxy of another user or player.

Rather than having the host or the impacted entity model the effect of the action inputted, the hybrid architecture of the present invention allows the client computer of the user which initiated the input to model and determine the effect. In one sense, in these certain specified situations, the client can in effect dictate certain actions to the host server. The server then in turn distributes that effect to the other game clients in the vicinity. This level of control by the client computer is, however, predicated upon the basis that the initiating client computer has received, from the server, information accurately reflecting the current state of other proxies in the vicinity. For example, in the detailed illustration of this type of interaction in FIG. 5, it is assumed that, at step 141, the server has advised all game clients near a target entity, designated "T", that entity T is already heavily damaged. At step 143, the user tells his client computer to fire a weapon at T. That client computer not only models the weapon firing but determines that the weapon will destroy T and sends a message reflecting that fact to the host server as indicated at block 145. The server in turn echoes that message to game clients representing entities or proxies near T, including also the client computer representing T itself.

The client computer representing T receives that message and schedules its own destruction as indicated at block 149, displays the incoming weapon as indicated at 151, and triggers an animation sequence reflecting its own destruction as indicated at 153. Other game clients receive the same message and likewise schedule destruction of T as indicated at block 155 and display the weapon flying towards T as indicated at block 157. At the scheduled destruction time, the display of these other game clients change T to a "destroyed" appearance.

The initiating client computer on the other hand initiates a display of a weapon flight independently of the server as indicated at block 161 and after an appropriate delay which can to some extent mask any lack of synchronization between the several client computers also changes its display to reflect a destroyed appearance for T as indicated at block 165. By having the initiating client computer control its own display independently of the host server or the client computer for the impacted proxy, a realistic display can be maintained and the latency of the communications network masked.

While it is a significant aspect of the present invention that it provides for modeling of the effect of certain user input ("impact input") by the initiating client computer, it should be understood that there may also be categories of user input which will affect the proxy of another user but which do not require such immediate and local modeling. Such other types of user input may therefore be relayed to the host computer for interpretation, with the host then distributing messages defining the effect to all clients whose proxies are in the vicinity. Thus, while the availability of local modeling of certain interactive events is important, it should not be understood that such modeling is necessary for all events of that general class.

In view of the foregoing it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

APPENDIX

| | | |
|---|---|---|
| G→M | PING {Sequence Number} | Compute latency. If sequence is 0: Send ID message. Send LATENCY message. Send KIND, INIT, and STATUS messages. If computed latency is extremely high, send another PING right away. otherwise wait a while before sending another one. If consistently high latencies are measured, send REOPEN. |
| M→G | LATENCY {One way time estimate} | Compute new server-to-client time offset. |
| M→G | KIND {Cardinal of Sub-messages} [{Kind} {Kill Kind} {Name Cardinal} {Model name String}]* | Load the media model. Note the mapping between Value and loaded model.[5] Note the kind to switch to on kill.[6] |
| M→G | INIT {Cardinal of Sub-messages} { {E/D} {Kind} {X} {Y} {Angle} {Damage} {IFF}]* | Create, Replace or Move Model identified by EID. |
| G→M | NEWENTITY {EID} | Create a new entity for the client and associate the client's SWID with that entity.[7] If non-zero, the EID indicates the identity of another entity of which the client would like to take control. |
| G→M | STATUS {Status List} | Store state.[8] |
| M→G | STATUS {Status List} | Update local state. |
| M→G | DAMAGE {Damage} {EID} | Update notion of damage state of EID.[9] |
| M→G | ID {EID} | Note ownship ID |
| G→M | SCANRIGHT {Starting Angle} | Store state. Send to neighboring clients. |
| M→G | SCANRIGHT {Starting Angle} {EID} SCANLEFT SCANUP SCANDOWN | Update model EID (apply latency correction and smoothing) same semantics as RIGHT |
| G→M | STOPGUN {Yaw Angle} {Pitch Angle} | Store state. Send to neighboring clients. |
| M→G | STOPGUN {Yaw Angle} {Pitch Angle } {EID} | Update model EID (apply latency correction and smoothing) |
| G→M | STABILIZE {Heading Angle} {Elevation Angle} {EID} | Store state. Send to neighboring clients. |

APPENDIX-continued

| | | |
|---|---|---|
| M→G | STABILIZE {Heading Angle} {Elevation Angle} {EID} | Update model EID (apply latency correction and smoothing) |
| G→M | TRACK {Target EID} | Store state. Send to neighboring clients. |
| M→G | TRACK {Target EID} {EID} | Update model EID (apply latency correction and smoothing). If EID is ownship ID, sound alert. |
| G→M | MISS {X} {Y} | Record event. Echo to neighboring clients. |
| M→G | MISS {Y} {Y} {EID} | Display fire at EID muzzle immediately. Display detonation at specified server time. |
| G→M | HIT {Target EID} {Entity Coord} {Weapon} | Record event. Echo to neighboring clients. |
| M→G | HIT {Target EID} {Entity Coord} {Weapon} {EID} | Display fire at EID muzzle immediately. Display detonation on Target EID at specified server time. If appropriate. display missile at interpolated position between EID at receipt and Target EID at specified server time. |
| G→M | KILL {Target EID} {New Model Kind} {Weapon} | Record event. Store state. Echo to neighboring clients. |
| M→G | KILL {Target EID} {New Model Kind} {Weapon} {EID} | Display fire at EID muzzle immediately. Display detonation on Target EID and change model to new kind at specified server time. If appropriate, display missile at interpolated position between EID at receipt and Target EID at specified server time. |
| G→M | EXPLODE {Target EID} {New Model Kind} {Weapon} | Record event. Store state. Echo to neighboring clients. |
| M→G | EXPLODE {Target EID} {New Model Kind} {Weapon} | Display effect at Target EID and change model to new kind at specified server time. |
| G→M | FLARE | Note presence of flare which will prevent heat-seeking missiles from scoring a hit in most cases. |
| G→M | IFF {IFF Value} | Store state. Echo to neighboring clients. |
| M→G | IFF {IFF Value} {EID} | Update map. If EID is ownship, note value as default setting. |
| G→M | IFFFLASH {IFF Value} | Echo to neighboring clients. |
| M→G | IFFFLASH {IFF Value} {EID} | Show large flash of IFF signal on map. |
| G→M | APPEARANCE {Appearance} | Note new appearance. Send corresponding model number to neighboring clients via an INIT message. |
| G→M | DOSSIER {EID} | Look up dossier of identified vehicle and pass back to client as radio message. |
| G→M | SPEED {Speed Value} | Replan. Send PLAN to client and neighboring clients. |
| G→M | WAYPOINT {Goal Index} {X} {Y} | Note waypoint.[10] |
| G→M | GOAL {Goal Index} {X} {Y} | Replan. Send PLAN to client and neighboring clients. |
| G→M | DIRECTEDGOAL {X} {Y} {Angle} | Replan. Send PLAN to client and neighboring clients. |
| G→M | STOP | Replan. Send PLAN to client and neighboring clients.[11] |
| G→M | TUNER {Channel} | Note channel to which the client is tuned. Forward subsequent messages on that channel to this client. |
| G→M | RADIO {Message Cardinal} {Message String} | Prepend user handle onto message. Forward the message to all subscribers of that channel. |
| M→G | RADIO {Message Cardinal} {Message String} | Display message. |
| M→G | PLAN {EID} {Spatial Cardinal} {Temporal Cardinal} [{Spatial Point}]* [{Temporal Point}]* | Update model (which may be ownship) including latency, correction and smoothing. |
| M→G | PLAN3D {EID} {Spatial Cardinal} {Temporal Cardinal} {AGL} [{Spatial Point} ]* Temporal Point}[* | Update model (which may be ownship) including latency correction and smoothing. |

What is claimed is:

1. A method providing for interacting play between distributed users of a computer game set in a virtual world, said method comprising:

interconnected by a data communication network, a host computer and a plurality of client computers;

running on said host computer, a host program for tracking and coordinating the definitive state of the game;

running on each of said client computers, a display program component, said display program component being responsive to messages received from said host computer and to local user input for displaying a virtual world and, within said virtual world, proxies representing users of said client computers;

running on each client computer, a second program component responsive to at least two discrete kinds of user input, goal input which identifies user proxy movement within said virtual world and impact input which identifies direct interaction between the inputting user's proxy and the proxy of an identified other user, said second program component responding to user goal input by sending a corresponding goal message to said host computer, the host program responding to a goal message by transmitting, to the inputting user's client computer and to the client computers whose proxies are in the vicinity of the inputting user's proxy, a message defining a plan of movement for the inputting user's proxy, the display program on each such client computer being responsive to said movement plan messages for controlling the display of the respective proxies, said second program component responding to user impact input to generate an effect plan defining the effect the impact input will have on the other users' proxy, the effect plan being both sent to said host computer and directly acted upon by the inputting user's display program, the host computer program responding to an impact message by transmitting, to other client computers whose proxies are in the vicinity of the inputting user's proxy, a message defining the effect of said direct interaction as determined by the inputting user's client computer, whereby the inputting user's display and the displays of said other client computers show the same actions at respectively appropriate times.

2. A method as set forth in claim 1 wherein said data communecation network is the Internet.

3. A method as set forth in claim 1 wherein said client computers are personal computers.

4. A method as set forth in claim 1 wherein said proxies are tanks and said virtual world is a battlefield.

5. A method providing for interacting play of a computer game set in a virtual world by distributed users of respective personal computers having access to a pervasive data communication network, said method comprising:

providing a host computer;

running on said host computer, a host program for distributing data defining said vertual world and tracking and; coordinating the definitive state of the game;

running on each participating personal computers, a display program component, said display program compinent being responsive to messages received from said host computer and to local user input for displaying said virtual world and, within said virtual world, proxies representing users of other personal computers participating the game;

running on each participating personal computer, a second program component responsive to at least two discrete kinds of user input, goal input which identifies user proxy movement within said virtual world and impact input which identifies direct interaction between the inputting user's proxy and the proxy of an indentified other user, said second program component responding to user goal input by sending a corresponding goal message to said host computer, the host program responding to a goal message by transmitting, to the inputting user's personal computer and to the personal computers of other users whose proxies are in a vicinity of inputting uesr's proxy, a messsage defining a plan of movement for the inputting user's proxy, the display program on each such client computers being responsive to said movement plan messages for controlling the display of the respective proxy, said second program responsive to the user impact input to generates an effect plan defining the effect the impact input will have on other users' proxy, the effect plan being both sent to said host computer and directly acted upon by the inputting user's display program, the host computer program responding to an impact message by transmitting, to another client computers whose proxies are in the vicinity of the inputting user's proxy, a message defining the effect of said direct interaction as determined by the inputting user's client computer, whereby this inputting uesr's display and the displays of said other participating personal computers shown the same actions at respectively appropriate times.

6. A method as set forth in claim 5 wherein said data communication network is the Internet.

7. A system as set forth in claim 6 wherein said client computers are personal computers.

8. A computer game apparatus that includes personal computers each enabling a user to participate in interacting play between distributed users of the computer game set in a virtual world defined and coordinated by a host computer commonly accessed through a data communication network, said game apparatus comprising:

a display program component running on said personal computers, said display program component being responsive to messages received from said host computer and to local user input for displaying a virtual world and, within said virtual world, proxies representing users of participating personal computers;

a second program component running on said personal computers responsive to at least two discrete kinds of user input, goal input which identifies user proxy movement within said virtual world and impact input which identifies direct interaction between the inputting user's proxy and the proxy of an identified other user, said second program component responding to user goal input by sending a corresponding goal message to said host computer directing it to generate a goal message which is transmitted, to the inputting user's personal computer and to the personal computers of other users whose proxies are in the vicinity of the inputting user's proxy, a message defining a plan of movement for the inputting user's proxy, the display program component on each such participating personal computer being responsive to said movement plan messages received from said host computer for controlling the display of the respective proxies, said second program component responding to user impact input to generate an effect plan defining the effect the impact input will have on the other users' proxy, the effect plan being directly acted upon by the inputting user's display program component and transmitted to said host computer to direct the host computer to transmit, to other client computers whose proxies are in the vicinity of the inputting user's proxy, a message defining the effect of said direct interaction as determined by the inputting user's client computer, whereby the inputting user's display and the displays of other participating personal computers show the same actions at respectively appropriate times.

9. A computer game appparatus as set forth in claim 8 wherein said data communication network is the Internet.

* * * * *